Aug. 2, 1932.  M. R. COLLER  1,870,097

DEVICE FOR LIFTING AND MOVING TRANSFORMERS

Filed May 21, 1931

Merwin R. Coller
INVENTOR

BY Victor J. Evans and Co. ATTORNEY

Patented Aug. 2, 1932

1,870,097

UNITED STATES PATENT OFFICE

MERWIN R. COLLER, OF NORTH HOLLYWOOD, CALIFORNIA

DEVICE FOR LIFTING AND MOVING TRANSFORMERS

Application filed May 21, 1931. Serial No. 539,051.

This invention relates to a device especially adapted to be used for lifting and moving transformers and other heavy liquid containers and its consists in the novel features hereinafter described and claimed.

An object of the invention is to provide a device of the character stated which is strong and durable and which may be easily and quickly manipulated for lifting heavy articles without tilting or spilling their contents.

With this object in view the device includes a wheel mounted axle having an upright frame mounted thereon, a handle is disposed transversely across the upper end of the frame and lies at a right angle to the plane of the frame. A hook is connected with the handle and may engage a bail which in turn engages the ears of the body of the transformer. Braces are connected with the frame and axle and also with the handle. The parts are so arranged that when the body of the transformer is lifted and the end of the handle is swung in a downward direction the lower end of the transformer comes in contact with the intermediate portion of the axle and therefore the body of the transformer is prevented from swinging or tilting so that the contents thereof will not spill.

In the accompanying drawing:—

Figure 1:
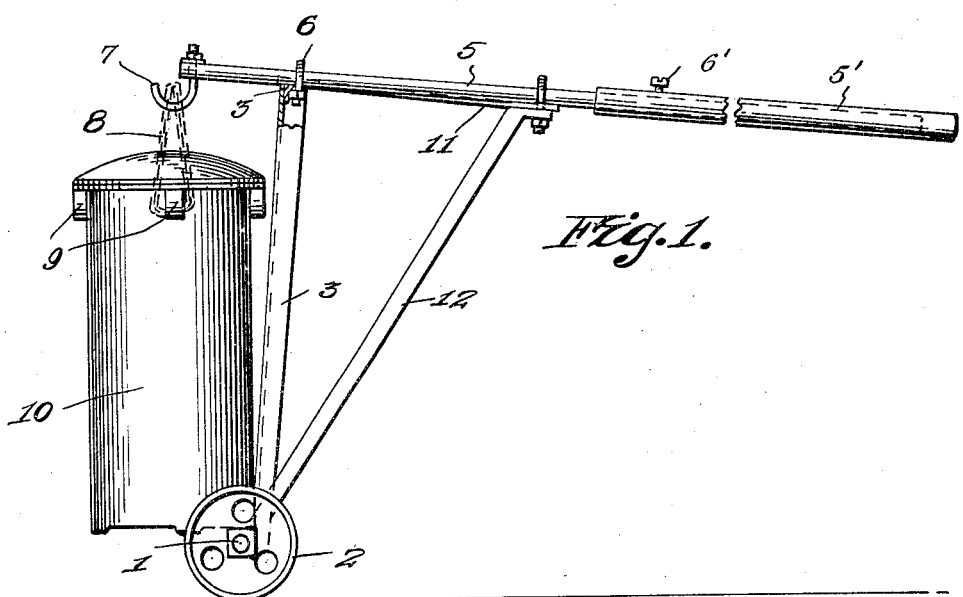
Figure 1 is a side elevational view of the device showing the same lifting a transformer.
Figures 2, 3:
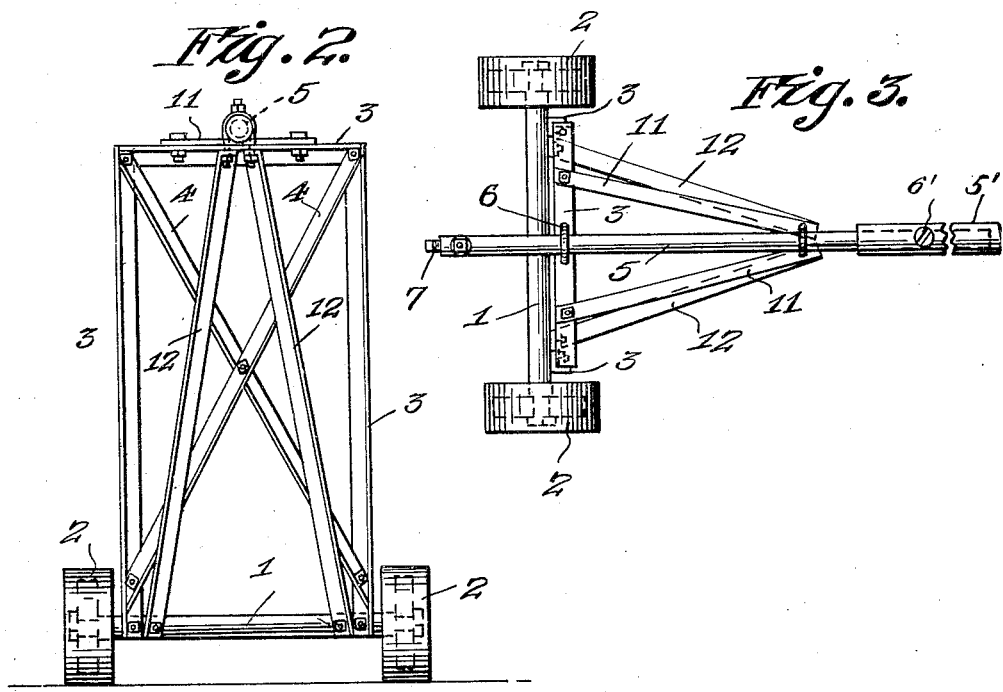
Figure 2 is a rear elevational view of the lifting device.
Figure 3 is a top plan view of the same.

The lifting device includes an axle 1 having wheels 2 journaled upon the ends thereof. A frame 3 is mounted upon the axle 1 and is formed from angle iron. The said frame includes cross braces 4. A handle 5 is disposed transversely across the upper end of the frame 3 and lies in a plane at a right angle to the plane of the frame 3. The handle 5 is secured to the frame by means of a U-bolt 6. A hook 7 is carried at the forward end of the handle 5 and may engage a chain 8 or a bail (not shown) and the said chain or bail may engage under the ears 9 of a transformer 10. Upper braces 11 are connected with the intermediate portion of the handle 5 and the lower braces 12 are also connected with the intermediate portion of the handle 5. The forward ends of the braces 11 are attached to the upper end of the frame 3 and the lower ends of the braces 12 are connected with the axle 1.

When in use the handle 5 is tilted so that the hook 7 is engaged under the chain 8 which in turn engages under the ears 9 of the transformer. The rear end of the handle 5 is then swung in a downward direction and the frame 3 is swung upon the axle 1 so that the transformer 10 is lifted and the lower end of the transformer 10 comes in contact with the axle 1 therefore the transformer is lifted and is prevented from swinging and being transported from one point to another and consequently the contents of the body of the transformer will not spill or splash out.

A telescopic extension 5' is mounted upon the handle 5 and is held thereon by a set screw 6'. By shifting the extension upon the handle greater leverage may be had.

Having described the invention what is claimed is:

A lifting and moving device for heavy containers comprising an axle, wheels journaled upon the axle, a rectangular frame having side members attached to the axle at one side thereof, cross braces disposed across the frame and secured at their ends at the corners and in the vicinity of the side members thereof, a handle mounted upon the frame and disposed at a right angle thereto, said handle having an end portion extending in advance of the frame and the axle, a hook carried by the handle and adapted to be connected with the article to be lifted and moved, upper braces connected with the intermediate portion of the handle and the top of the frame at points spaced from the upper corners thereof and lower braces connected with the intermediate portion of the handle and the side of the axle at points adjacent the side members of the frame.

In testimony whereof I affix my signature.

MERWIN R. COLLER.